(12) United States Patent
Mohsenian

(10) Patent No.: US 8,548,044 B2
(45) Date of Patent: Oct. 1, 2013

(54) RATE CONTROL IN A VIDEO ENCODER ACCORDING TO A BIT COUNT ESTIMATE

(75) Inventor: Nader Mohsenian, Lawrence, MA (US)

(73) Assignee: Broadcom Corporation, Irvine, CA (US)

( * ) Notice: Subject to any disclaimer, the term of this patent is extended or adjusted under 35 U.S.C. 154(b) by 3030 days.

(21) Appl. No.: 11/043,575

(22) Filed: Jan. 26, 2005

(65) Prior Publication Data

US 2006/0165165 A1   Jul. 27, 2006

(51) Int. Cl.
*H04N 7/12* (2006.01)
(52) U.S. Cl.
USPC .................................................. 375/240.03
(58) Field of Classification Search
USPC .................................................. 375/240.03
See application file for complete search history.

(56) References Cited

U.S. PATENT DOCUMENTS

2005/0084007 A1*  4/2005  Lightstone et al. ...... 375/240.03
2006/0159355 A1*  7/2006  Mizuno .......................... 382/239

OTHER PUBLICATIONS

D. Marpe, H. Schwarz and T. Weigand, "Context-Based Adaptive Binary Arithmetic Coding in the H.264/AVC Video Comression Standard", IEEE Trans.Circuits Syst. Video Technol., vol. 13, No. 7, pp. 620-636, Jul. 2003.*

* cited by examiner

*Primary Examiner* — Richard Torrente
(74) *Attorney, Agent, or Firm* — Brinks Hofer Gilson & Lione

(57) ABSTRACT

Described herein is a rate controller in a video system. The rate controller is comprised of a bit count estimator and a quantization selector. The bit count estimator receives an input to an encoder and generates a bit count estimate. The bit count estimate is an approximation of a bit count at an output of the encoder. The quantization selector sets a quantization value based on the bit count estimate.

18 Claims, 4 Drawing Sheets

FIGURE 3    300

RATE CONTROL IN A VIDEO ENCODER ACCORDING TO A BIT COUNT ESTIMATE

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One of the key components of a video encoder is a robust rate control technology that can intelligently maximize output video quality while meeting the stringent requirements of a system or product design. For example, in video communications applications it is often necessary to transmit at a fixed bit rate. Any extra amount of information transmitted beyond this fixed bit rate would be discarded, and transmitting at a lower bit rate would be a waste of bandwidth. When the bandwidth is wasted, video quality is less than ideal. Similarly, preparing a video stream for media storage (e.g. DVD) necessitates the population of a disk to the maximum capacity such that no disk partition is wasted.

Encoded video should minimize spatial and temporal redundancies to achieve compression and optimize bandwidth usage. To achieve a given Quality of Service (QoS) with an even smaller bandwidth, video compression systems exploit the statistical redundancies in video sources by entropy encoding. Even though cutting edge video encoders make use of sophisticated tools to de-correlate spatial, temporal, and spectral sample dependencies, there are still some hidden statistical redundancies which remain embedded in the stream. Thorough identification of such redundancies plays a major role in reducing the size of the final output video stream. These redundancies are higher order correlations that are next to impossible to distinguish with low order predictors and are best identified via entropy coders. Since video sources are non-stationary in statistical sense, advanced entropy coders can take advantage of context modeling to adapt to changes in the source and achieve better compaction.

During real-time encoding, the actual number of bits output from a video encoder must be fed back to compute deviations in bit rate. A bit rate controller uses these deviations for future adjustments. With advanced entropy encoding, bits output from a video encoder can be delayed by the inherent complexity of this encoding technique. Therefore, a new approach is required for controlling bit rate in a video encoder that uses an advanced entropy engine.

BRIEF SUMMARY OF THE INVENTION

Described herein are rate controllers for use in encoding video data.

In one embodiment of the invention, a rate controller in a video encoder system is presented. The rate controller is comprised of a bit count estimator and a quantization selector. The bit count estimator receives an input to an encoder and generates a bit count estimate. The bit count estimate is an approximation of a bit count at an output of the encoder. The quantization selector sets a quantization value based on the bit count estimate.

In another embodiment, a method for rate control is presented. A bit count estimate is generated based on an input to an encoder. The bit count estimate is an estimate of a bit count at an output of the encoder. A quantizer level is selected based on the bit count estimate.

In another embodiment, an integrated circuit for controlling bit rate in a video encoder is presented. The integrated circuit comprises arithmetic logic and memory. The arithmetic logic is operable to calculate a bit count estimate for a picture or portion of a picture. The memory is operable to store quantization levels that may be used by the video encoder. The arithmetic logic selects a quantization level to be used by the video encoder based on the bit count estimate.

These and other advantages and novel features of the present invention, as well as illustrated embodiments thereof, will be more fully understood from the following description and drawings.

DETAILED DESCRIPTION OF THE INVENTION

According to certain aspects of the present invention, a system and method for rate control are presented. A target bit rate can be met since an estimate of bit count is generated in real-time even while advanced entropy encoders are enabled.

Most video applications require the compression of digital video for transmission, storage, and data management. A video encoder performs the task of compression. The video encoder minimizes spatial, temporal, spectral, and statistical redundancies to achieve compression. Entropy encoding is well suited for the removal of statistical redundancies. With advanced entropy encoding, the number of bits (or bit rate) output from an entropy encoder in the video encoder must be fed back to a rate controller quickly, but the inherent complexity of advanced entropy encoding will delay the generation of these output bits. If the video encoder cannot estimate an accurate number of bits in real-time with an advanced entropy encoder, the video encoder would have to resort to using a simpler (less efficient) entropy encoder to generate the video encoder output. The use of less efficient entropy encoders reduces the overall compression ratio of a system, and output quality suffers.

Figure 1:
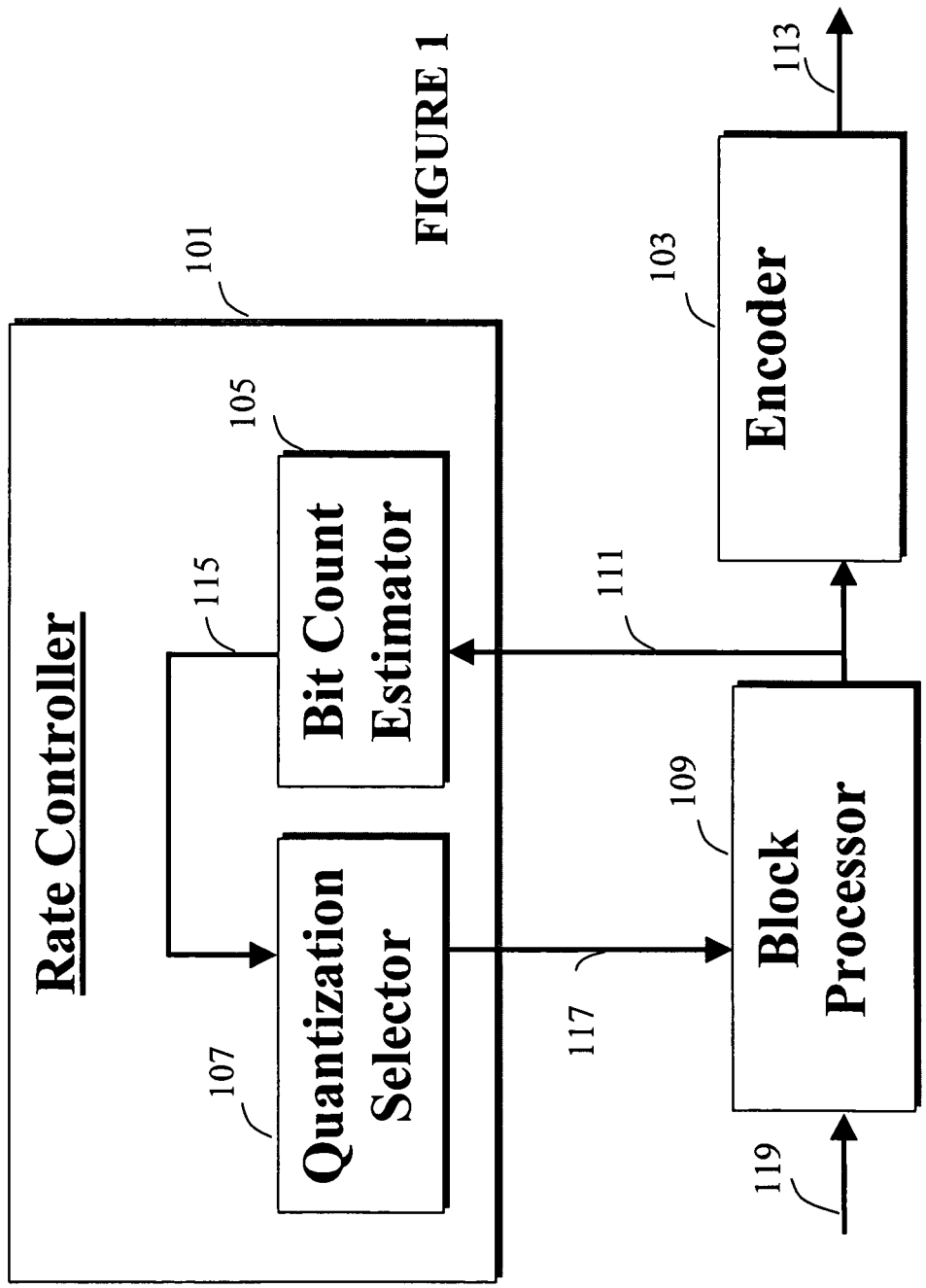
FIG. 1 is a block diagram of an exemplary video system with a rate controller in accordance with an embodiment of the present invention.

In FIG. 1 a block diagram of an exemplary video system 100 with a rate controller 101 is presented. In addition to the rate controller 101, the video system 100 includes an encoder 103 and block processor 109. Source video 119 is input to a block processor 109. The block processor 109 may be responsible for transformation, quantization, motion estimation, motion compensation, and inverse transformation. A block processor output 111 enters the encoder 103, and a video encoder output 113 is produced. Typically, it is necessary to have an accurate and current count of the bits in the video encoder output 113 in order to maintain a fixed bit rate. When the encoder 103 is complicated, there could be a processing delay that prohibits a direct count of the bits in the video encoder output 113 in real-time. The processing delay can be a function of aspects such as bit rate and picture complexity, and during a scene change, the encoder 103 can fall behind the block processor 109. A bit count estimator 105 can be used to generate a bit count estimate 115. To select a quantization level 117 for updating the block processor 109, a quantization selector 107 uses the bit count estimate 115. A series of quantization levels may be precomputed and stored in memory.

The bit count estimator 105 can compensate for the processing delay and provide a seamless transition in video quality at data boundaries where there could be a bottleneck. Design of the bit count estimator 105 can be done off-line and have either constant or picture adaptive parameters. The bit count estimator 105 may be designed in arithmetic logic as a co-processor.

Moving Picture Experts Group (MPEG)

The Moving Picture Experts Group (MPEG) standardizes digital video encoding. One exemplary standard is the ITU-H.264 Standard (H.264). H.264 is also known as MPEG-4, Part 10, and Advanced Video Coding. In the H.264 standard video is encoded on a picture-by-picture basis, and pictures are encoded on a macroblock by macroblock basis. H.264 specifies the use of spatial prediction, temporal prediction, transformation, interlaced coding, and lossless entropy coding to compress the macroblocks. The term picture is used throughout this specification to generically refer to frames, fields, macroblocks, or portions thereof.

Using the MPEG compression standards, video is compressed while preserving image quality through a combination of spatial, temporal, and spectral compression techniques. To achieve a given Quality of Service (QoS) with an even smaller bandwidth, video compression systems exploit the statistical redundancies in video sources; even though cutting edge video encoders make use of sophisticated tools to de-correlate spatial, temporal, and spectral sample dependencies, there are still some hidden statistical redundancies which remain embedded in the stream. Thorough identification of such redundancies plays a major role in reducing the size of the final output video stream. These redundancies are higher order correlations that are next to impossible to distinguish with low order predictors and are best identified via entropy coders. Since video sources are non-stationary in statistical sense, advanced entropy coders can take advantage of context modeling to adapt to changes in the source and achieve better compaction.

MPEG-4, Part 10 specifies two types of entropy coding: Context-based Adaptive Binary Arithmetic Coding (CABAC) and Context-based Adaptive Variable-Length Coding (CAVLC). CABAC produces the most efficient compression, especially for high color images.

Context-Based Adaptive Arithmetic Coding (CABAC)

The stages of CABAC are Binarization, Context Model Selection, Arithmetic Encoding, and Context Model Updating. Binarization converts a non-binary-valued symbol into a binary code prior to arithmetic coding. Quantized input values are reduced in range to create symbols of one's and zeros for each input value. The result of Binarization is called a bin string or bins. Context Model Selection is used to determine an accurate probability model for one or more bins of the bin string. The context modeler samples the input bins and assigns probability models based on a frequency of observed bins. This model may be chosen from a selection of available models depending on the statistics of recently coded data symbols. The context model stores the probability of each bin being "1" or "0". With Arithmetic Encoding each bin is encoded according to the selected context model. There are just two sub-ranges for each bin: corresponding to "0" and "1". A mapping engine utilizes the context model and assigns bits to input bins. Generated bits are to be embedded in an outgoing video stream. Context model updating is based on the actual coded value (e.g. if the bit value was "1", the frequency count of "1"s is increased). The same generated bits that are to be embedded in the outgoing video stream are fed back to context modeling to update probabilities of observed events.

Figure 2:
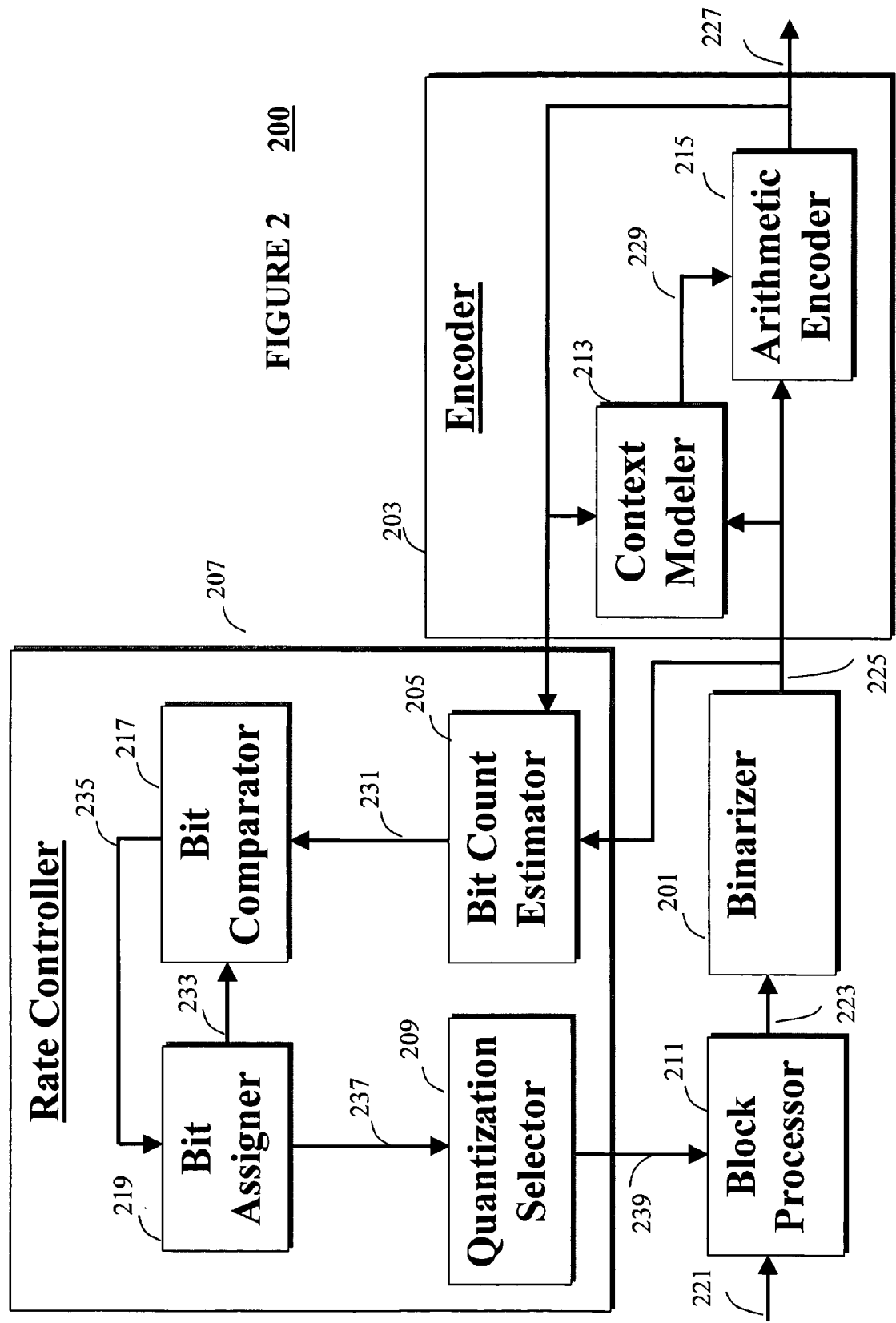
FIG. 2 is another block diagram of an exemplary video system with a rate controller in accordance with an embodiment of the present invention.

In FIG. 2, another block diagram of an exemplary video system 200 with a rate controller 207 is presented. The rate controller 207 is comprised of a bit count estimator 205, a bit comparator 217, a bit assigner 219, and a quantization selector 209. In addition to the rate controller 207, the video system 200 includes an encoder 203, a block processor 211, and a binarizer 201.

Source video 221 is input to a block processor 211. A block processor output 223 enters the binarizer 201, and a bin string 225 is produced. Together, the binarizer 201, a context modeler 213, and an arithmetic encoder 215 perform the stages of CABAC as described previously. To produce an encoder output 227, the arithmetic encoder 215 uses a context model 229. The encoder output 227 is used to update the context modeler 213, and in some cases, the encoder output 227 can be used by the bit count estimator 205 as a part of the bit count estimate 231 or to update a bins-to-bits function in the bit count estimator 205.

Examples of bins-to-bits functions that can estimate a bit count 115 based on bins of the block processor output 111 may be first order: bits=$a_0+a_1$x(bins), quadratic: bins=$a_0+a_1$x(bins)+$a_2$x(bins$^2$), or higher order: bins=$a_0+a_1$x(bins)+$a_2$x(bins$^2$) . . . +$a_N$x(bins$^N$). Coefficients, $a_0, a_1, a_2, \ldots a_N$, can remain constant or adapt to the content of the video in real-time. In the latter case, the video encoder output 113 of the encoder 103 is supplied to the bins-to-bits function in the bit count estimator 105 to fine-tune coefficients, $a_0, a_1, a_2, \ldots a_N$, as the statistical nature of the source changes over time. The bins-to-bits function may keep useful operating points and discard unnecessary data. For example, points taken from a certain scene should not be used to estimate bits in another scene, and different bins-to-bits functions can be adopted to accommodate delays in different picture types.

The binarizer 201 is relatively fast while the context modeler 213 and the arithmetic encoder 215 can take more time. The complexity of an adaptive entropy encoder may be due to silicon technology limitations and the fact that accurate probability models require the processing of a large number of samples. While the context adaptive entropy engine is occupied with digesting the sample field, the rest of the video encoder hardware or software blocks will move forward in time. Very large pictures or very high bit rates further advance the delay. Further, some static sequences might be comprised of a super-sized picture. Consequently, the encoder output 227 can be delayed from time to time when certain modules of the video encoders would want to sample them instantly.

The rate controller 207 is responsible for meeting a set bit-rate for the compressed video stream. However, due to the complexity of the encoder 203, it might take significant clock cycles to process enough bins to deduce reliable probability functions for the context modeler 213. In this case, the encoder output 227 is not accessible by the rate controller 207. This means the encoder output 227 would be ready sometimes in the future as a feedback. The rate controller 207 solves this delay bottleneck by sampling the binarizer output 225 that is instantly available. Bins are fed to a bins-to-bits function to generate a bit count estimate 231 (or portion thereof).

The bit assigner 219 of the rate controller 207 computes a balance defined as ideal bits 233 against which the bit count estimate 231 is compared. The bit assigner 219 could be different for a group of pictures, a picture, a series of macroblocks, or other collection of image samples. The comparison in the form of delta bits 235 is input back to the bit assigner 219. Another bit assigner output 237 is used to select a quantization level 239 for the block processor 211. These functions of the rate controller 207 may be implemented in arithmetic logic.

The ideal bits 233 may be assigned for an accumulated number of macroblocks. If the block processor 211 has just finished processing the $n^{th}$ macroblock and another series of calculations for macroblock n+1 begins, the rate controller 207 requires the encoder output 227. There are three scenarios:

1) The total accumulated number of bits at the encoder output 227 for macroblocks 1 through n is available, and this value is provided to the rate controller 207;
2) Only the total accumulated number of bits at the encoder output 227 for macroblocks 1 through m (m<n) is available; and
3) No count is available.

Partial bits would be available when the output of the bit encoder 203 (or entropy engine) lags the block processor 223 by a few macroblocks, but not exceeding the boundary of the picture. Partial bits can be combined with the bit count estimate to produce a new bit count estimate. For the scenario when no count is available, the delay of entropy engine is larger than n macroblocks, and the entropy engine is still busy processing data in a previous picture. Therefore, sampling of a current picture has not begun. Since a lag is created, there is no contribution from an actual bit count in the bit count estimate 231, and the best estimate of delayed bits is wholly provided by the bins-to-bits function. The bit count estimate 231 of delayed bits is compared against ideal bits 233 and a difference in the form of delta bits 235 is fed back to the bit assigner 219 to set (by way of the quantization selector 209) a proper quantizer value 239 for encoding of the next macroblock indexed by n+1.

Figure 3:
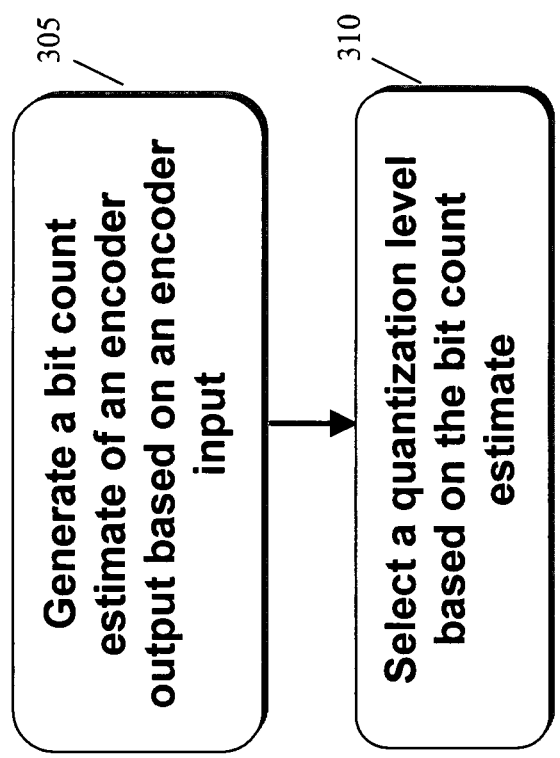
FIG. 3 is a flow diagram of an exemplary method for rate control in accordance with an embodiment of the present invention.

FIG. 3 is a flow diagram of an exemplary method for rate control 300. A bit count estimate of an encoder output is generated based on an encoder input 305. Then a quantization level is selected based on the bit count estimate 310.

Figure 4:
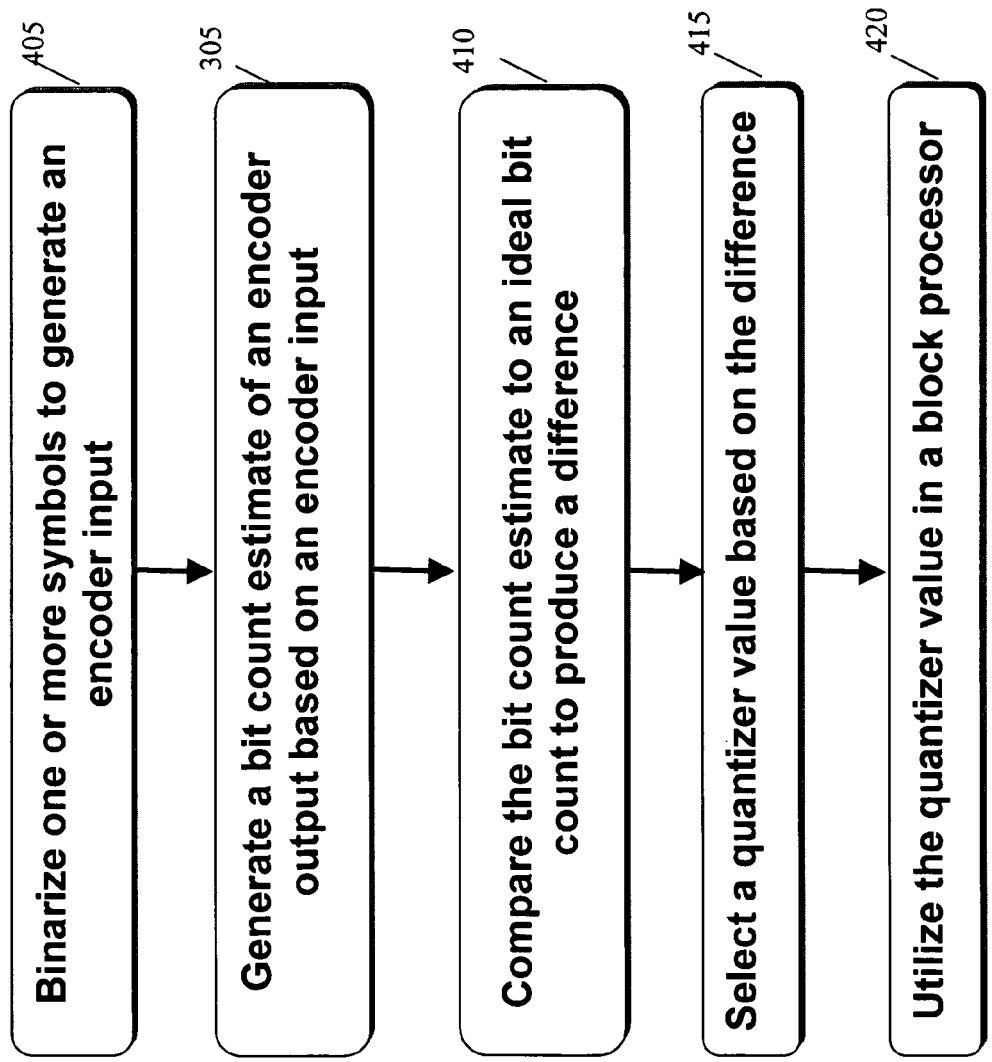
FIG. 4 is another flow diagram of an exemplary method for rate control in accordance with an embodiment of the present invention.

FIG. 4 is another flow diagram of an exemplary method for rate control 400. First, binarize one or more symbols to generate a encoder input 405. Then, generate a bit count estimate of a encoder output based on a encoder input 305 as in 300. Then, compare the bit count estimate to an ideal bit count to produce a difference 410. Select a quantizer value based on the difference 415, and finally, utilize the quantizer value in a block processor 420.

The embodiments described herein may be implemented as a board level product, as a single chip, application specific integrated circuit (ASIC), or with varying levels of a video classification circuit integrated with other portions of the system as separate components.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

Limitations and disadvantages of conventional and traditional approaches will become apparent to one of ordinary skill in the art through comparison of such systems with the present invention as set forth in the remainder of the present application with reference to the drawings.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on MPEG-4 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for rate control, said method comprising:
generating a bit count estimate based on an input to an encoder, wherein the bit count estimate is an estimate of a bit count at an output of said encoder; and
selecting a quantizer level based on the bit count estimate.

2. The method of claim 1, wherein the encoder is an arithmetic encoder.

3. The method of claim 1, wherein the encoder is an entropy encoder.

4. The method of claim 1, wherein the method further comprises: binarizing one or more symbols, thereby generating the input to the encoder.

5. The method of claim 1, wherein generating the quantizer level further comprises:
comparing the bit count estimate to an ideal bit count, thereby producing a difference; and
selecting a quantizer value based on the difference.

6. The method of claim 1, wherein the method further comprises: utilizing the quantizer value in a block processor.

7. A rate controller for video encoding, said rate controller comprising:
a bit count estimator operable to receive an input to an encoder and generating a bit count estimate, wherein the bit count estimate estimates a bit count at an output of said encoder; and
a quantization selector operable to set a quantization value based on the bit count estimate.

8. The rate controller of claim 7, wherein the encoder is an arithmetic encoder.

9. The rate controller of claim 7, wherein the encoder is an entropy encoder.

10. The rate controller of claim 7, wherein the input to the encoder is a binarization of one or more symbols.

11. The rate controller of claim 7 further comprising:
a bit comparator operable to compare the bit count estimate to an ideal bit count, thereby producing a difference; and a quantization selector operable to select the quantizer value based on the difference.

12. The rate controller of claim 7, wherein a block processor utilizes the quantizer value.

13. An integrated circuit for controlling bit rate, said integrated circuit comprising:
arithmetic logic operable to receive an input to an encoder and generate a bit count estimate, wherein the bit count estimate approximates a bit count of an output from said encoder; and
memory for storing one or more quantization levels;
wherein the bit count estimate is used to select a quantization level in the one or more quantization levels.

14. The integrated circuit of claim 13, wherein the encoder is an arithmetic encoder.

15. The integrated circuit of claim 13, wherein the encoder is an entropy encoder.

16. The integrated circuit of claim 13, wherein the input to the encoder is a binarization of one or more symbols.

17. The integrated circuit of claim 13, wherein the arithmetic logic is further operable:
to compare the bit count estimate to an ideal bit count, thereby producing a difference, wherein the quantizer value is based on said difference.

18. The integrated circuit of claim 13, wherein a block processor utilizes the quantizer value.

* * * * *